US012731404B2

(12) United States Patent
Huang et al.

(10) Patent No.: US 12,731,404 B2
(45) Date of Patent: Sep. 8, 2026

(54) OBJECT DETECTION DEVICE AND CONFIDENCE THRESHOLD ADJUSTMENT METHOD FOR OBJECT DETECTION

(71) Applicant: VIA Technologies, Inc., New Taipei City (TW)

(72) Inventors: Chung-Ching Huang, New Taipei City (TW); Shu-Cheng Chi, New Taipei City (TW); Kuo-Han Chang, New Taipei City (TW)

(73) Assignee: VIA Technologies, Inc., New Taipei City (TW)

( * ) Notice: Subject to any disclaimer, the term of this patent is extended or adjusted under 35 U.S.C. 154(b) by 187 days.

(21) Appl. No.: 18/900,823

(22) Filed: Sep. 29, 2024

(65) Prior Publication Data

US 2025/0139973 A1 May 1, 2025

Related U.S. Application Data

(60) Provisional application No. 63/594,428, filed on Oct. 31, 2023.

(30) Foreign Application Priority Data

Jul. 17, 2024 (TW) ................................ 113126704

(51) Int. Cl.
*G06V 20/52* (2022.01)
*G06V 10/14* (2022.01)

(52) U.S. Cl.
CPC .......... *G06V 20/52* (2022.01); *G06V 2201/07* (2022.01)

(58) Field of Classification Search
CPC .. G06V 20/52; G06V 2201/07; G06V 10/809; G06V 10/811; G06V 10/14; G06V 10/765; G01D 21/02; G01V 9/00
See application file for complete search history.

(56) References Cited

U.S. PATENT DOCUMENTS

2021/0125013 A1* 4/2021 Chen ...................... G06V 20/10
2022/0284216 A1* 9/2022 Moreira Rodrigues ..................... B25J 13/08
2023/0154193 A1* 5/2023 Popov ..................... G06F 18/24 382/105

FOREIGN PATENT DOCUMENTS

CN 110348270 10/2019
TW 202117594 5/2021

* cited by examiner

*Primary Examiner* — Siamak Harandi
(74) *Attorney, Agent, or Firm* — JCIPRNET

(57) ABSTRACT

An object detection device and a confidence threshold method adjustment method are provided. The object detection device includes an optical camera, multiple sensors, and a processor. The optical camera and sensors are used to respectively capture a real-time video and environmental value of a detection area. The processor performs an object recognition model and at least one second recognition model. The object recognition model determines whether an object exists in the detection area based on the real-time video to generate a first recognition result and a corresponding first confidence value. The at least one second recognition model generates a second result based on the environmental value respectively. The processor dynamically adjusts a confidence threshold value based on a value of the second result and a correlation degree between the object and the second result. The processor determines whether to generate an output result based on the adjusted confidence threshold value and the first confidence value from the first recognition result.

16 Claims, 3 Drawing Sheets

OBJECT DETECTION DEVICE AND CONFIDENCE THRESHOLD ADJUSTMENT METHOD FOR OBJECT DETECTION

CROSS-REFERENCE TO RELATED APPLICATION

This application claims the priority benefit of U.S. provisional application Ser. No. 63/594,428, filed on Oct. 31, 2023, and Taiwan application serial no. 113126704, filed on Jul. 17, 2024. The entirety of each of the above-mentioned patent applications is hereby incorporated by reference herein and made a part of this specification.

BACKGROUND

Technical Field

The disclosure relates to an object detection technology based on artificial intelligence (AI), and more particularly, to an object detection device and a confidence threshold adjustment method for object detection.

Description of Related Art

Artificial intelligence (AI) is increasingly used in applications. For example, information (e.g., an image) may be obtained through a sensor first, and then AI recognition may be used to determine whether a specific object exists. In the software technology related to AI, the aforementioned object detection model, object classification model, or prediction model (hereinafter referred to as an AI model) will provide a corresponding confidence value (confidence score) for a result generated by itself. If the confidence value is higher, it means that the AI model is more confident in the result, and vice versa. Therefore, a user of the AI model will set a confidence threshold value to decide whether to adopt the result of the AI model through the confidence value.

However, if the confidence threshold value is set to a fixed value, it will be difficult to adapt to different application scenarios. Some AI models are easily affected by environmental changes. If the confidence threshold value is set to a fixed value, and the confidence threshold value is poorly set from the beginning, a false positive or false negative rate of the object will be too high, resulting in poor performance of the AI model.

SUMMARY

The disclosure provides an object detection device and a confidence threshold adjustment method for object detection, which makes a determination result of an object detection model more accurate, reduces the probability of false positives or false negatives, and may adapt to various application scenarios.

An object detection device in the disclosure includes an optical camera, multiple sensors, and a processor. The optical camera is configured to capture a real-time video of a detected area. The sensors is configured to capture an environmental value in the detected area. The processor receives the real-time video and the environmental value. The processor is configured to perform an object recognition model and at least one second recognition model. The object recognition model determines whether an object exists in the detected area based on the real-time video to generate a first recognition result and a corresponding first confidence value, and the at least one second recognition model generates at least one second result according to the environmental value respectively. The processor dynamically adjusts a confidence threshold value based on a value of the at least one second result and a correlation degree between the object and the at least one second result. The processor determines whether to generate an output result based on the adjusted confidence threshold value and the first confidence value from the first recognition result.

A confidence threshold adjustment method for object detection includes the following steps. A real-time video and an environmental value of a detected area are captured. An object recognition model and at least one second recognition model are performed. The object recognition model determines whether an object exists in the detected area based on the real-time video to generate a first recognition result and a corresponding first confidence value, and the at least one second recognition model generates at least one second result according to the environmental value respectively. A confidence threshold value is dynamically adjusted based on a value of the at least one second result and a correlation degree between the object and the at least one second result. It is determined whether to generate an output result based on the adjusted confidence threshold value and the first confidence value from the first recognition result.

Based on the above, according to the object detection device and the confidence threshold adjustment method for object detection described in the embodiments of the disclosure, the confidence threshold value of the object detection model is dynamically adjusted by using the result of the auxiliary recognition model (e.g., the second recognition model), which may reduce the probability of false positives or false negatives, and may adapt to various application scenarios.

DETAILED DESCRIPTION OF DISCLOSED EMBODIMENTS

An object detection model implemented based on AI is required to set a corresponding confidence threshold value. Generally speaking, the setting of the confidence threshold value requires professional knowledge to be carried out accurately. If the confidence threshold value cannot be accurately set, a false positive or false negative rate of the object detection model may be too high. Another method is to, through experiments, use a trial and error method to continuously adjust the confidence threshold value to find an appropriate value and under the condition of suffering a large number of false positives or false negatives.

In the embodiment of the disclosure, the confidence threshold value of the object detection model is dynamically adjusted by using results of collecting multiple auxiliary recognition models (e.g., smoke detection models, optical detection models, temperature detection models, etc.), and using a correlation degree between the results and occurrence of the object (for example, a relationship between the results and the occurrence of the object is positive or negative), thereby making determination results of the object detection model more accurate, allowing the embodiment of the disclosure to adapt to multiple application scenarios, so as to reduce the probability of false positives or false negatives. The auxiliary recognition model may make a determination through AI, or it may also obtain a corresponding result through a preset software algorithm.

Figure 1:
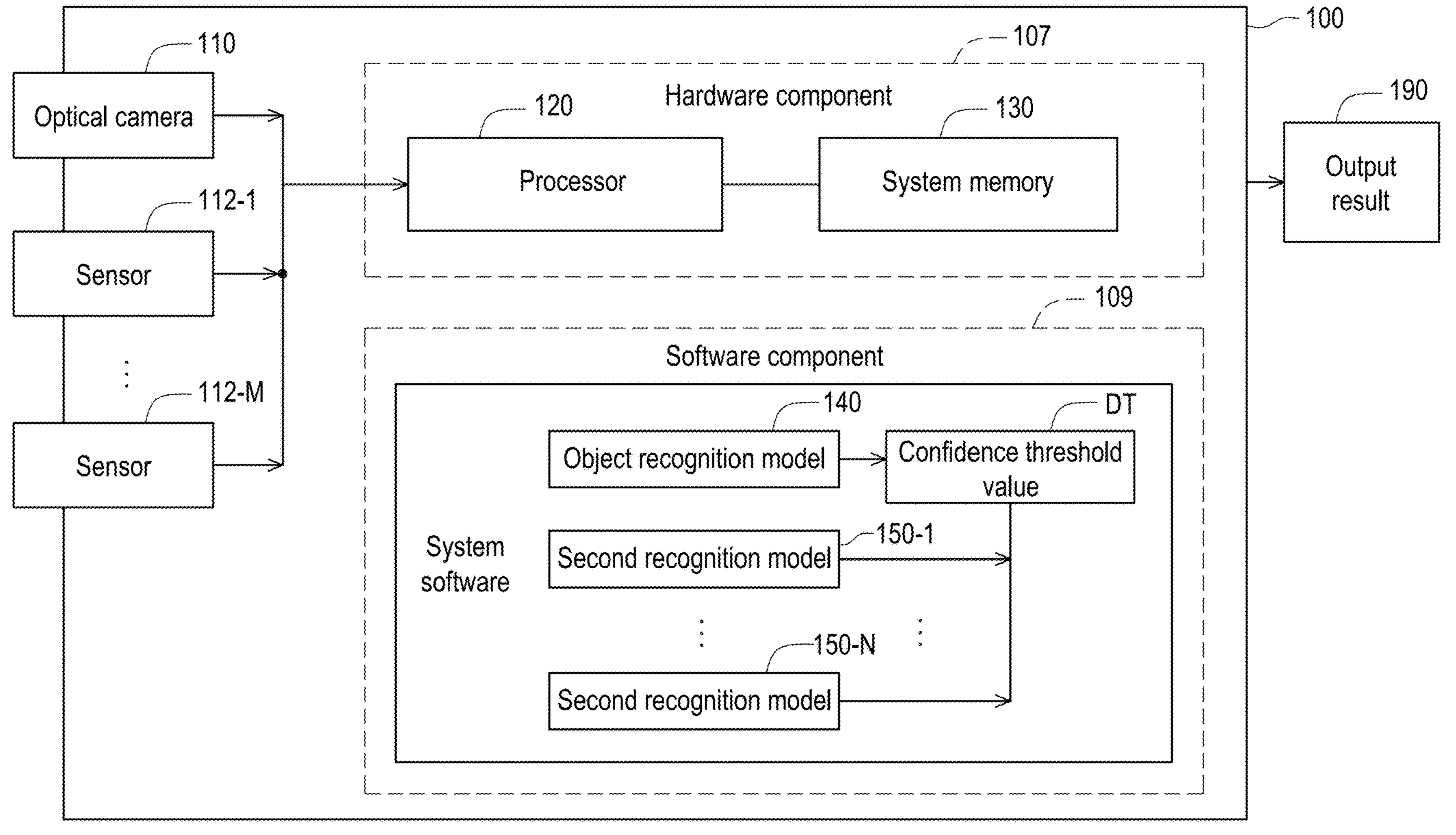
FIG. 1 is a block diagram of an object detection device according to an embodiment of the disclosure.

FIG. 1 is a block diagram of an object detection device 100 according to an embodiment of the disclosure. Referring to FIG. 1, the object detection device 100 includes an optical camera 110, multiple sensors 112-1 to 112-M (M is a positive integer, and M is greater than or equal to 1), a hardware component 107, and a software component 109.

The hardware component 107 includes a processor 120 and a system memory 130. The processor 120 may be a central processing unit (CPU), a graphic processing unit (GPU), or corresponding hardware. The system memory 130 may be a cache memory, a hard disk, a random access memory, or corresponding hardware that may access data.

The software component 109 may be implemented by program codes stored in the system memory 130 or a corresponding storage medium through the processor 120 and the system memory 130 in the hardware component 107. The software component 109 in this embodiment may include system software (e.g., an operating system), an object recognition model 140 and at least one second recognition model 150-1 to 150-N (N is a positive integer, and N is greater than or equal to 1). In other words, the processor 120 is used to perform the object recognition model 140 and the at least one second recognition model 1501 to 150-N.

The optical camera 110 is used to capture a real-time video of a detected area. The object recognition model 140 may determine whether a specific object exists in the detected area based on the aforementioned real-time video to generate a first recognition result and generate a corresponding first confidence value for the first recognition result. The object in this embodiment may be an object such as flames and vehicles that are dangerous to public security. The object recognition model 140 in this embodiment may determine whether the aforementioned object exists in the detected area through AI or a corresponding algorithm. The first confidence value is used to represent a confidence degree of the object recognition model 140 for the first recognition result.

The sensors 112-1 to 112-M are used to capture environmental value in the detected area. The environmental value may include one of a temperature value, an optical transmittance, and a suspended particle value or a combination thereof, and a type of the sensor is adjusted accordingly depending on requirements of the second recognition model for the environmental value. The second recognition models 150-1 to 150-N may be one of the optical detection model, the temperature detection model, and the smoke detection model or a combination thereof. Each of the second recognition models 150-1 to 150-N may generate a corresponding second result according to the corresponding environmental value respectively. The optical detection model may obtain a detection result of optical characteristics through a corresponding sensing value of a far-infrared detector. The temperature detection model may obtain a current temperature in the detected area through a corresponding temperature value of a temperature detector. The smoke detection model may obtain the concentration of suspended particles in the detected area through the suspended particle value detected by the sensor. The second recognition models 150-1 to 150-N in this embodiment may also be called auxiliary recognition models. Those who apply this embodiment may choose different recognition models as the auxiliary second recognition model according to their needs.

Figure 2:
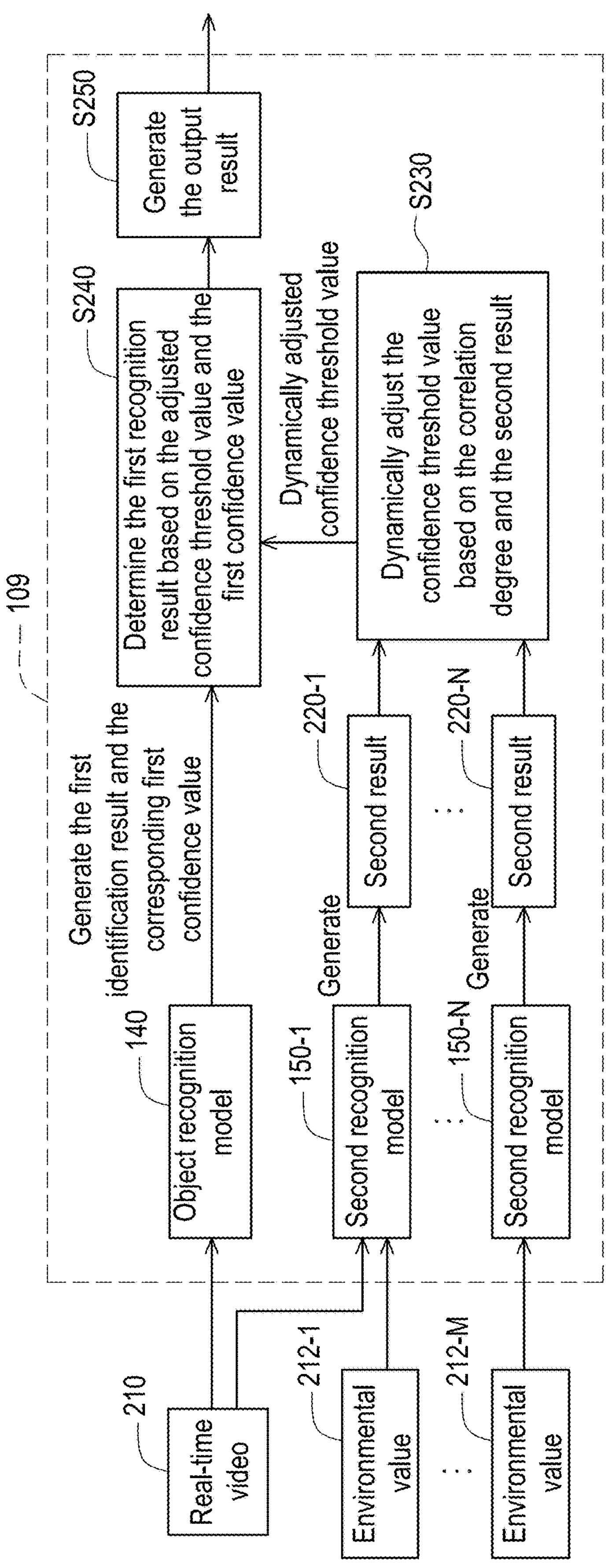
FIG. 2 is a schematic diagram of an object recognition model and a second recognition model according to an embodiment of the disclosure.

The processor 120 dynamically adjusts a confidence threshold value DT based on a value of the aforementioned second result and the correlation degree between the aforementioned object and the second result. In addition, the processor 120 determines whether to generate an output result 190 based on the confidence threshold value DT and the first confidence value generated by the first recognition result of the object recognition model 140. FIG. 2 shows detailed operations and corresponding detailed descriptions.

FIG. 2 is a schematic diagram of the object recognition model 140 and the second recognition models 150-1 to 150-N according to an embodiment of the disclosure. Referring to FIGS. 1 and 2, the processor 120 in FIG. 1 is used to perform the object recognition model 140 and the second recognition models 150-1 to 150-N. The object recognition model 140 generates the first recognition result and the corresponding first confidence value based on the real-time video. The second recognition models 150-1 to 150-N generate at least one second result 220-1 to 220-N according to environmental values 212-1 to 212-M respectively.

In step S230 in FIG. 2, the processor 120 in FIG. 1 dynamically adjusts the confidence threshold value based on the value of the aforementioned second result and the correlation degree between the object and the second result. Specifically, the processor 120 in FIG. 1 first sets an initial confidence threshold value of the object recognition model 140, and then dynamically adjusts the initial confidence threshold value according to different scenarios. The processor 120 in FIG. 1 sets corresponding upper limit values of coefficients for the second recognition models 150-1 to 150-N respectively. In addition, the processor 120 in FIG. 1 sets the second recognition models 150-1 to 150-N to one of positive correlation and negative correlation respectively based on the correlation degree between the aforementioned object and the second results 220-1 to 220-N. The processor 120 in FIG. 1 calculates the adjusted confidence threshold value based on the aforementioned initial confidence threshold value, the set upper limit value of the coefficient, one of the positive correlation and the negative correlation, and second confidence values corresponding to the second results 220-1 to 220-N.

In step S240 in FIG. 2, the processor 120 in FIG. 1 determines whether the output result may be generated based on the first recognition result, and the first recognition result is affected by the adjusted confidence threshold value and the first confidence value from the first recognition result (step S250). In this embodiment, assuming that the adjusted confidence threshold value is "0.8" and the first confidence value is "0.56", since the first confidence value of "0.56" is less than the adjusted confidence threshold value of "0.8", it means that the first recognition result may not pass a confidence test, and the output result is not generated. In contrast, assuming that the first confidence value is "0.91", since the first confidence value of "0.91" is greater than the adjusted confidence threshold value of "0.8", it means that the first recognition result passes the confidence test. Therefore, the output result will be generated based on the first recognition result.

An example is provided here to describe step S230 in FIG. 2 in detail. Referring to FIG. 2, in the first embodiment, the detected area is a liquid nitrogen storage area of a chemical factory. The object recognition model 140 is an AI model for detecting flames. That is, the "flame" is a detected object. The second recognition models 150-1 to 150-N are the optical detection model and the temperature detection model respectively, and N is equal to 2. In other words, the second recognition models 150-1 to 150-N are represented as multiple auxiliary recognition models. It is assumed that the processor sets the initial confidence threshold value of the object recognition model 140 to "0.8".

Considering optical and chemical characteristics of liquid nitrogen stored in the detected area when it volatilizes, an upper limit value of a coefficient of the optical detection model is set to "0.2", and an upper limit value of a coefficient of the temperature detection model is set to "0.1"; a correlation degree of the optical detection model is "positive correlation" (that is, when a detection value of the optical sensor is changed, the probability of existence of the flames is higher), and a correlation degree of the temperature detection model is "positive correlation" (that is, when an environmental temperature is higher, the probability of existence of the flames is higher). The description that the upper limit value of the coefficient of the optical detection model is "0.2" is as follows. The liquid nitrogen is occasionally required to be depressurized during storage. Release of some liquid nitrogen will cause smoke, but the smoke is not smoke from the flames. Therefore, in this embodiment, an influence of the optical detection model is reduced a little (that is, the upper limit value of the coefficient is "0.2"). In addition, the description that the upper limit value of the coefficient of the temperature detection model is "0.1" is as follows. In this embodiment, an influence of the temperature detection model is reduced (that is, the upper limit value of the coefficient is "0.1") because the liquid nitrogen will cause a relatively large temperature difference, while liquid nitrogen will not support combustion or be flammable after being converted into nitrogen. Therefore, an influence on flame detection may be reduced to a greatly low level.

Therefore, when the optical detection model has a detection operation, the processor normalizes the second result generated by the optical detection model to selectively set the second result to a unit positive value or a unit negative value based on one of the set positive correlation and negative correlation. For example, the normalized value is a unit negative value (i.e., "−1") when the optical detection model has the detection operation, and it is a unit positive value (i.e., "+1") when the optical detection model does not have the detection operation. In addition, the processor normalizes the second result generated by the temperature detection model. The normalized value is a unit negative value (i.e., "−1") when the temperature detection model has the detection operation, and it is a unit positive value (i.e., "+1") when the temperature detection model does not have the detection operation.

Therefore, when the optical detection model has the detection operation (the normalized value is "−1"), and the corresponding second confidence value is 100% (the upper limit value of the coefficient is "0.2"), and when the temperature detection model does not have the detection operation (the normalized value is "+1"), and the second confidence value is 100% (the upper limit value of the coefficient is "0.1"), the processor calculates the adjusted confidence threshold value based on the initial confidence threshold value ("0.8"), and the set upper limit value of the coefficient (respectively "0.2" and "0.1"), one of the positive correlation and the negative correlation, and the second confidence value corresponding to the second result (respectively "100%" and "100%"). That is, a value of the initial confidence threshold value ("0.8") plus the normalized value ("−1") of the optical detection model multiplied by the second confidence value ("100%") and the upper limit value of the coefficient of "0.2" plus a value of the normalized value ("+1") of the temperature detection model multiplied by the second confidence value ("100%") and the upper limit value of the coefficient of "0.1" is used as the adjusted confidence threshold value (0.8−0.2+0.1="0.7"). In this embodiment, the adjusted confidence threshold value is different from the initial confidence threshold value.

In this embodiment, the initial confidence threshold value is "0.8" and the adjusted confidence threshold value is "0.7". Assuming that the first confidence value is "0.75", since the first confidence value of "0.75" is less than the initial confidence threshold value of "0.8", it means that the first recognition result may not pass a confidence test, and the output result is not generated. However, after the initial confidence threshold value is adjusted from "0.8" to "0.7", the first confidence value of "0.75" is greater than the adjusted confidence threshold value of "0.7", it means that the first recognition result passes the confidence test. Therefore, the output result will be generated based on the first recognition result.

In the second embodiment with reference to FIG. 2, the detected area is a butadiene storage area of a chemical factory. The object recognition model 140 is the AI model for detecting flames. The second recognition models 150-1 to 150-N are still the optical detection models and the temperature detection models. It is assumed that the processor sets the initial confidence threshold value of the object recognition model 140 to "0.8".

Considering optical and chemical characteristics of butadiene stored in the detected area when it volatilizes, the upper limit value of the coefficient of the optical detection model is set to "0.3", and the upper limit value of the coefficient of the temperature detection model is set to "0.3"; the correlation degree of the optical detection model is "positive correlation", and the correlation degree of the temperature detection model is "positive correlation".

Therefore, when the optical detection model has the detection operation (the normalized value is "−1"), and the corresponding second confidence value is 100% (the upper limit value of the coefficient is "0.3"), and when the temperature detection model does not have the detection operation (the normalized value is "+1"), and the second confidence value is 100% (the upper limit value of the coefficient is "0.3"), the processor calculates the adjusted confidence threshold value based on the initial confidence threshold value ("0.8"), the set upper limit value of the coefficient (respectively "0.3" and "0.3"), one of the positive correlation and the negative correlation, and the second confidence value corresponding to the second result (respectively "100%" and "100%"). That is, a value of the initial confidence threshold value ("0.8") plus the normalized value ("−1") of the optical detection model multiplied by the second confidence value ("100%") and the upper limit value of the coefficient of "0.3" plus a value of the normalized value ("+1") of the temperature detection model multiplied by the second confidence value ("100%") and the upper limit value of the coefficient of "0.3" is used as the adjusted confidence threshold value (0.8−0.3+0.3−"0.8"). In this way, although the optical detection model has the detection operation, since the temperature detection model does not have the detection operation, it means that it is better for the object recognition model 140 to maintain the original initial confidence threshold value ("0.8") for detecting the flames. In this embodiment, the adjusted confidence threshold value is the same as the initial confidence threshold value. It means that the first recognition result could be affected by the adjusted confidence threshold value or the initial confidence threshold value.

In the third embodiment with reference to FIG. 2, the detected area is a vinyl chloride storage area of a chemical factory. The object recognition model 140 is the AI model for detecting flames. The second recognition models 150-1 to 150-N are still the optical detection models and the temperature detection models. It is assumed that the processor sets the initial confidence threshold value of the object recognition model 140 to "0.8".

Considering optical and chemical characteristics of vinyl chloride stored in the detected area when it volatilizes, the upper limit value of the coefficient of the optical detection model is set to "0.3", and the upper limit value of the coefficient of the temperature detection model is set to "0.1"; the correlation degree of the optical detection model is "positive correlation", and the correlation degree of the temperature detection model is "positive correlation". The reason why the upper limit value of the coefficient of the temperature detection model is set to "0.1" is that heat of vaporization of vinyl chloride is low and does not cause any temperature changes. Therefore, the second result generated by the temperature detection model is not very useful for reference.

Therefore, when the optical detection model has the detection operation (the normalized value is "−1"), and the corresponding second confidence value is 100% (the upper limit value of the coefficient is "0.3"), and when the temperature detection model does not have the detection operation (the normalized value is "+1"), and the second confidence value is 100% (the upper limit value of the coefficient is "0.1"), the processor calculates the adjusted confidence threshold value based on the initial confidence threshold value ("0.8"), the set upper limit value of the coefficient (respectively "0.3" and "0.1"), one of the positive correlation and the negative correlation, and the second confidence value corresponding to the second result (respectively "100%" and "100%"). That is, the value of the initial confidence threshold value ("0.8") plus the normalized value ("−1") of the optical detection model multiplied by the second confidence value ("100%") and the upper limit value of the coefficient of "0.3" plus the value of the normalized value ("+1") of the temperature detection model multiplied by the second confidence value ("100%") and the upper limit value of the coefficient of "0.1" is used as the adjusted confidence threshold value (0.8−0.3+0.1="0.6"). In this embodiment, the adjusted confidence threshold value is different from the initial confidence threshold value.

In this embodiment, the initial confidence threshold value is "0.8" and the adjusted confidence threshold value is "0.6". Assuming that the first confidence value is "0.7", since the first confidence value of "0.7" is less than the initial confidence threshold value of "0.8", it means that the first recognition result may not pass a confidence test, and the output result is not generated. However, after the initial confidence threshold value is adjusted to from "0.8" to "0.6", the first confidence value of "0.7" is greater than the adjusted confidence threshold value of "0.6", it means that the first recognition result passes the confidence test. Therefore, the output result will be generated based on the first recognition result.

In the fourth embodiment with reference to FIG. 2, the detected area is a chimney area of a flare. The object recognition model 140 is an AI model for detecting air pollution smoke. In other words, the object recognition model 140 is a smoke detection model based on an RGB image. The second recognition models 150-1 to 150-N are RGB image flame detection models and the temperature detection models. It is assumed that the processor sets the initial confidence threshold value of the object recognition model 140 to "0.8".

Considering causes and characteristics of air pollution smoke in the detected area, an upper limit value of a coefficient of the RGB image flame detection model is set to "0.3", and the upper limit value of the coefficient of the temperature detection model is set to "0.3"; the correlation degree of the optical detection model is "positive correlation", and the correlation degree of the temperature detection model is "positive correlation".

Therefore, when the RGB image flame model has the detection operation (the normalized value is "−1"), and the corresponding second confidence value is 100% (the upper limit value of the coefficient is "0.3"), and when the temperature detection model has the detection operation (the normalized value is "−1"), and the second confidence value is 100% (the upper limit value of the coefficient is "0.3"), the processor calculates the adjusted confidence threshold value based on the initial confidence threshold value ("0.8"), the set upper limit value of the coefficient (respectively "0.3" and "0.3"), one of the positive correlation and the negative correlation, and the second confidence value corresponding to the second result (respectively "100%" and "100%"). That is, the value of the initial confidence threshold value ("0.8") plus the normalized value ("−1") of the optical detection model multiplied by the second confidence value ("100%") and the upper limit value of the coefficient of "0.3" plus a value of the normalized value ("−1") of the temperature detection model multiplied by the second confidence value ("100%") and the upper limit value of the coefficient of "0.3" is used as the adjusted confidence threshold value (0.8−0.3−0.3="0.2").

In this embodiment, the initial confidence threshold value is "0.8" and the adjusted confidence threshold value is "0.2". Assuming that the first confidence value is "0.3", since the first confidence value of "0.3" is less than the initial confidence threshold value of "0.8", it means that the first recognition result may not pass a confidence test, and the output result is not generated. However, after the initial confidence threshold value is adjusted from "0.8" to "0.2", the first confidence value of "0.3" is greater than the adjusted confidence threshold value of "0.2", it means that the first recognition result passes the confidence test. Therefore, the output result will be generated based on the first recognition result. In this way, since both the RGB image flame model and the temperature detection model have the detection operation, it indicates that the object recognition model 140 has a higher probability of detecting the air pollution smoke, while a lower probability of mist. Therefore, the confidence threshold value will be dynamically lowered. In this embodiment, the adjusted confidence threshold value is different from the initial confidence threshold value.

Figure 3:
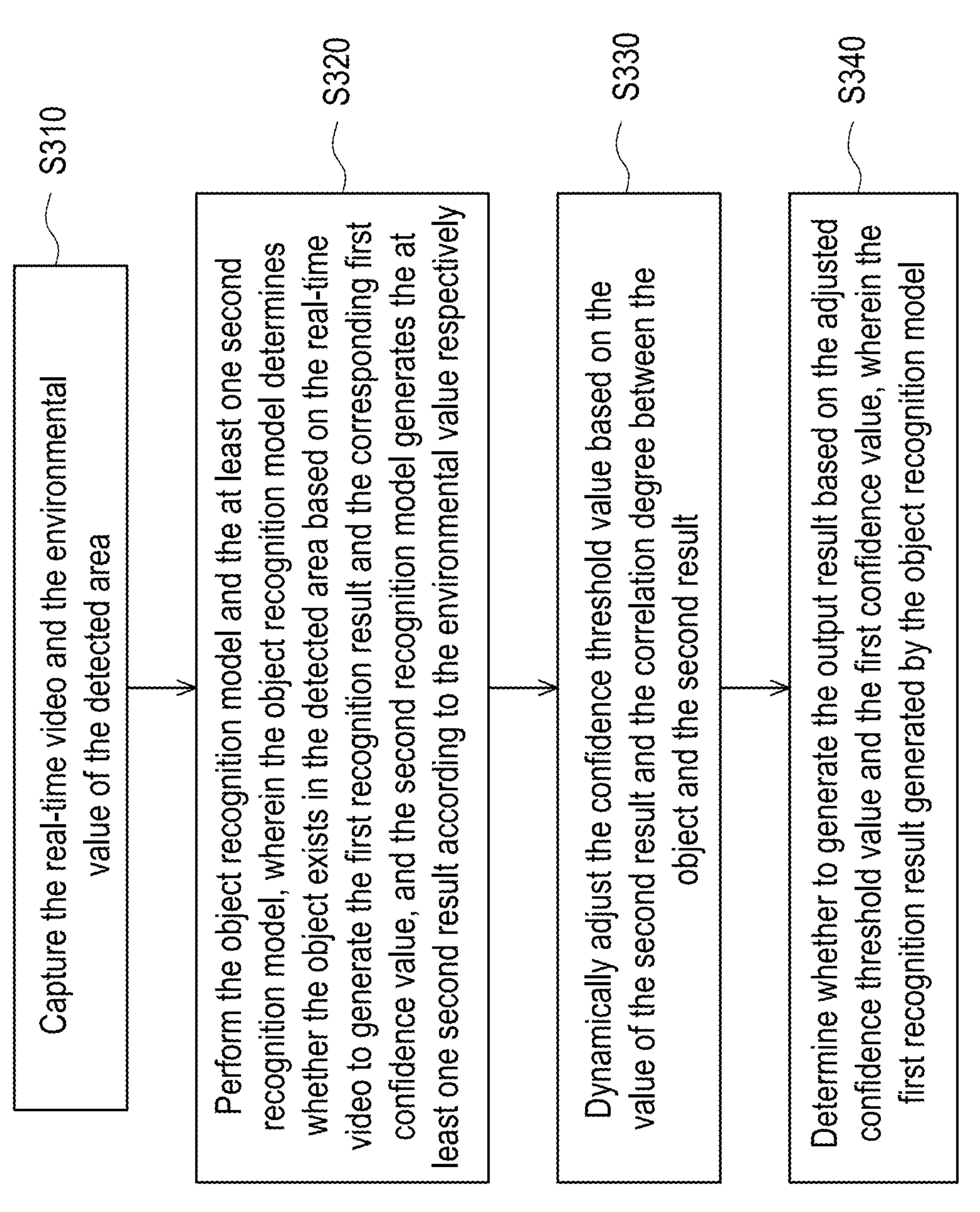
FIG. 3 is a flow chart of a confidence threshold adjustment method for object detection according to an embodiment of the disclosure.

FIG. 3 is a flow chart of a confidence threshold adjustment method for object detection according to an embodiment of the disclosure. The confidence threshold adjustment method in FIG. 3 is applicable to the object detection device 100 corresponding to FIGS. 1 and 2 mentioned above. In step S310, the processor respectively captures the real-time video and the environmental value of the detected area through the optical camera and the auxiliary sensors. In step S320, the processor performs the object recognition model and the at least one second recognition model. The aforementioned object recognition model determines whether the object exists in the detected area based on the real-time video to generate the first recognition result and the corresponding first confidence value. The aforementioned at least one second recognition model generates the at least one second result according to the environmental value respectively. In step S330, the processor dynamically adjusts the confidence threshold value based on the value of the aforementioned second result and the correlation degree between the aforementioned object and the aforementioned second result. In step S340, the processor determines whether to generate the output result based on the adjusted confidence threshold value and the aforementioned first confidence value, wherein the first recognition result generated by the object recognition model. For a detailed process and implementation of each of the steps in the confidence threshold adjustment method in FIG. 3, reference may be made to the aforementioned embodiments.

Based on the above, according to the object detection device and the confidence threshold adjustment method for object detection described in the embodiments of the disclosure, the confidence threshold value of the object detection model is dynamically adjusted by using the result of the auxiliary recognition model (e.g., the second recognition model), which may reduce the probability of false positives or false negatives, and may adapt to various application scenarios. In addition, when the confidence threshold value is dynamically adjusted, interactive results of the auxiliary recognition models (e.g., the second recognition model) may be referred, which may further avoid an issue of one single auxiliary recognition model excessively affecting the confidence threshold value.

Although the disclosure has been described with reference to the above embodiments, they are not intended to limit the disclosure. It will be apparent to one of ordinary skill in the art that modifications to the described embodiments may be made without departing from the spirit and the scope of the disclosure. Accordingly, the scope of the disclosure will be defined by the attached claims and their equivalents and not by the above detailed descriptions.

What is claimed is:

1. An object detection device, comprising:

an optical camera, configured to capture a real-time video of a detected area;

a plurality of sensors, configured to capture an environmental value in the detected area; and a processor, receiving the real-time video and the environmental value, wherein the processor is configured to perform an object recognition model and at least one second recognition model, wherein the object recognition model determines whether an object exists in the detected area based on the real-time video to generate a first recognition result and a corresponding first confidence value, and the at least one second recognition model generates at least one second result according to the environmental value respectively, the processor dynamically adjusts a confidence threshold value based on a value of the at least one second result and a correlation degree between the object and the at least one second result, and the processor determines whether to generate an output result based on the adjusted confidence threshold value and the first confidence value from the first recognition result.

2. The object detection device according to claim 1, wherein the at least one second recognition model comprises a plurality of auxiliary recognition models, and the processor is further configured to:

dynamically adjust the confidence threshold value based on a plurality of second results generated by the auxiliary recognition models and an upper limit value of a coefficient set corresponding to each of the auxiliary recognition models.

3. The object detection device according to claim 1, wherein the processor is configured to:

set an initial confidence threshold value of the object recognition model;

respectively set a corresponding upper limit value of a coefficient for the at least one second recognition model;

based on the correlation degree between the object and the at least one second result, respectively set the at least one second recognition model to one of positive correlation and negative correlation; and based on the initial confidence threshold value, the set upper limit value of the coefficient, one of the positive correlation and the negative correlation, and a second confidence value corresponding to the at least one second result, calculate the adjusted confidence threshold value.

4. The object detection device according to claim 3, wherein a value of the initial confidence threshold value is different from a value of the adjusted confidence threshold value.

5. The object detection device according to claim 3, wherein a value of the initial confidence threshold value is the same as a value of the adjusted confidence threshold value.

6. The object detection device according to claim 3, wherein the processor is further configured to:

normalize the at least one second result to selectively set the at least one second result to a unit positive value or a unit negative value based on the one of the set positive correlation and negative correlation.

7. The object detection device according to claim 1, wherein the at least one second recognition model is one of an optical detection model, a temperature detection model, a smoke detection model, or a combination thereof.

8. The object detection device according to claim 1, wherein the environmental value comprises one of a temperature value, an optical transmittance, a suspended particle value, or a combination thereof.

9. A confidence threshold adjustment method for object detection, comprising:

capturing a real-time video and an environmental value of a detected area;

performing an object recognition model and at least one second recognition model, wherein the object recognition model determines whether an object exists in the detected area based on the real-time video to generate a first recognition result and a corresponding first confidence value, and the at least one second recognition model generates at least one second result according to the environmental value respectively, dynamically adjusting a confidence threshold value based on a value of the at least one second result and a correlation degree between the object and the at least one second result; and determining whether to generate an output result based on the adjusted confidence threshold value and the first confidence value from the first recognition result.

10. The confidence threshold adjustment method according to claim 9, wherein the at least one second recognition model comprises a plurality of auxiliary recognition models, and wherein a step of dynamically adjusting the confidence threshold value based on the value of the at least one second result and the correlation degree between the object and the at least one second result comprises:

dynamically adjusting the confidence threshold value based on a plurality of second results generated by the auxiliary recognition models and an upper limit value of a coefficient set corresponding to each of the auxiliary recognition models.

11. The confidence threshold adjustment method according to claim 9, wherein a step of dynamically adjusting the confidence threshold value based on the value of the at least one second result and the correlation degree between the object and the at least one second result comprises:

setting an initial confidence threshold value of the object recognition model;

respectively setting a corresponding upper limit value of a coefficient for the at least one second recognition model;

based on the correlation degree between the object and the at least one second result, respectively setting the at least one second recognition model to one of positive correlation and negative correlation; and based on the initial confidence threshold value, the set upper limit value of the coefficient, one of the positive correlation and the negative correlation, and a second confidence value corresponding to the at least one second result, calculate the adjusted confidence threshold value.

12. The confidence threshold adjustment method according to claim 11, wherein a value of the initial confidence threshold value is different from a value of the adjusted confidence threshold value.

13. The confidence threshold adjustment method according to claim 11, wherein a value of the initial confidence threshold value is the same as a value of the adjusted confidence threshold value.

14. The confidence threshold adjustment method according to claim 11, wherein a step of, based on the correlation degree between the object and the at least one second result, respectively setting the at least one second recognition model to one of the positive correlation and the negative correlation comprises:

normalizing the at least one second result to selectively set the at least one second result to a unit positive value or a unit negative value based on the one of the set positive correlation and negative correlation.

15. The confidence threshold adjustment method according to claim 9, wherein the at least one second recognition model is one of an optical detection model, a temperature detection model, a smoke detection model, or a combination thereof.

16. The confidence threshold adjustment method according to claim 9, wherein the environmental value comprises one of a temperature value, an optical transmittance, a suspended particle value, or a combination thereof.

* * * * *